A. LOOMIS.
GEARING.
APPLICATION FILED MAR. 21, 1913.
1,106,149.
Patented Aug. 4, 1914.
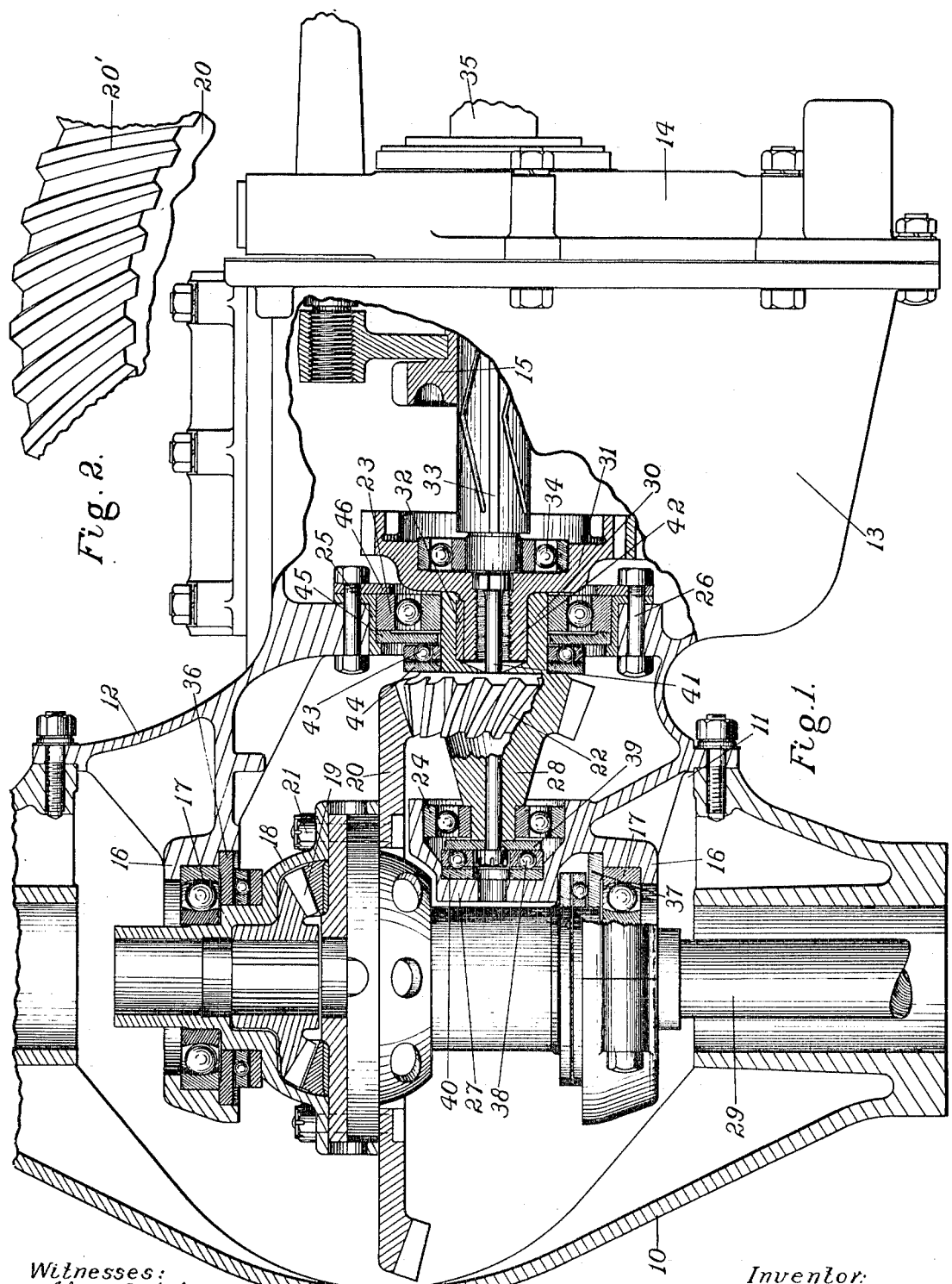

UNITED STATES PATENT OFFICE.

ALLEN LOOMIS, OF DETROIT, MICHIGAN, ASSIGNOR TO PACKARD MOTOR CAR COMPANY, OF DETROIT, MICHIGAN, A CORPORATION OF MICHIGAN.

GEARING.

1,106,149.   Specification of Letters Patent.   Patented Aug. 4, 1914.

Application filed March 21, 1913. Serial No. 755,919.

*To all whom it may concern:*

Be it known that I, ALLEN LOOMIS, a citizen of the United States, and resident of Detroit, Wayne county, State of Michigan, have invented certain new and useful Improvements in Gearing, of which the following is a specification.

This invention relates to motor vehicles and particularly to the transmission mechanism and driving axles thereof.

In the use of the ordinary straight tooth type of bevel gear in motor vehicle transmission mechanism, thrust bearings have been provided for backing up the gears only, as there is no thrust in those gears toward the focus point of the gear. With those gears also it was necessary to have the bearings of both the pinion and the bevel gear adjustable for the purpose of properly meshing the gears in the first instance and for taking up wear later. With the use of bevel gears of the type employed in this invention, that is, gears in which the teeth are arranged at a considerable angle to the radius of the gear, or tangentially, and preferably curved or of spiral form, it is found that the same accuracy in adjustment is not needed to get a quiet running pair of gears, and what little wear takes place does not particularly affect the operation of the gear. Also it is found that with such gears the end thrust on the pinion instead of being forwardly or away from the differential housing is rearwardly or toward the driven shaft, thus giving rise to difficulty in the bearings of the driving shaft if those bearings are not changed to take care of the changed conditions.

In the present invention, gears of the above referred to type are employed and thrust bearings are used to take care of the thrust on the driving pinion toward the rear axle. In this connection it will also be understood that in reversing the vehicle the end thrust on the bevel pinion is also reversed, so that it is necessary to have a thrust bearing to take the forward thrust also on the pinion shaft.

It will therefore be seen that one of the objects of this invention is to provide an improved mounting for the driving gears of a motor vehicle transmission mechanism.

Another object of the invention is to provide an improved mounting for bevel gears having tangentially arranged teeth.

Other objects of the invention will appear from the following description taken in connection with the drawings which form a part of this specification, and in which—

Figure 1 is a horizontal sectional view through a motor vehicle rear axle embodying this invention; and Fig. 2 is a detail view of one of the driving gears.

Referring to the drawings, 10 represents the central casing part of a motor vehicle rear axle or jack shaft, which casing has an opening 11 in its forward side. This opening 11 is closed by a cover 12 which also forms a support for all of the change speed gears and the differential mechanism. The support 12 has a forwardly extending casing part 13 and a front cover 14, the change speed gears being arranged within this casing part, and one of the sliding gears being shown at 15. The cover or support 12 also has integral lugs 16 extending into the casing 10 and supporting the radial bearings 17 for the differential housing 18. The differential gears 19 are shown in this housing and the bevel driven wheel 20 is shown as secured to the housing as by bolts 21. This gear wheel 20 has teeth 20' which are skewed or tangential. In Fig. 2 they are illustrated as of curved form.

A bevel driving pinion 22 of relatively small diameter and having teeth adapted to mesh with the teeth 20' of the gear wheel 20 is mounted in radial bearings 23 and 24, arranged on either side of the pinion. The radial bearing 23 is mounted directly in a sleeve 25, which is secured in the cover 12 by means of a series of bolts 26. The radial bearing 24 is mounted directly in an extension 27 of the lug 16, which extension is arranged between the pinion 22 and the differential housing 18.

In the above construction it will be understood that the integral shaft 28 of the pinion 22 forms the driving shaft of the motor vehicle transmission mechanism and the differential housing 18 and the axle sections 29 which it drives and which are connected to the road wheels of the vehicle, constitute the driven shaft thereof, these shafts being arranged in the same plane and at right angles to each other.

The hub 30 of the driving pinion 22 may be hollow as shown in Fig. 1 and one of the gears 31 of the change speed gearing may be pressed into said hub 30 and keyed thereto as by the key 32. Also the square shaft 33 of the change speed mechanism is alined with the driving pinion 22 and its rear end is mounted in a bearing 34 in the gear 31, as shown in the drawing. This square shaft 33 is, of course, driven from the motor through a propeller shaft 35, as is well known.

The end thrust of the differential housing 18 by reason of the meshing of the gears 20 and 22 is away from the gear 22, and for the purpose of resisting this end thrust a thrust bearing 36 is provided. This thrust bearing consists of two disks and a series of balls between them, one of the disks bearing directly against the differential housing 18 and the other bearing directly in the lug 16, as shown in Fig. 1 of the drawings. Thus with the gear wheel 20 bearing directly upon the differential housing 18, and the latter bearing directly upon the thrust bearing 36, which is mounted in the lug 16, there can be very little variation in manufacture, and, consequently, no adjustment is necessary to make these parts uniform in manufacture. A thrust bearing 37, similar to the thrust bearing 36, is provided on the opposite side of the differential housing 18, as shown in the drawings.

With ordinary straight tooth bevel gears, the end thrust on the driving shaft 28 would always be forwardly, whereas, with the form of skewed tooth and gear ratio substantially as shown in the drawings, and the driving shaft 28 turning in a clockwise direction looking toward the rear of the vehicle, the thrust on the driving shaft 28 will be toward the rear, or toward the differential housing 18. To resist this rearward end thrust a thrust bearing 38 is provided, the disk 39 of which rests directly against the rearward end of the driving shaft 28 and the disk 40 of which rests directly in the extension 27 of the lug 16. The disk 39 also holds the radial bearing 24 on the end of the shaft 28, and a securing bolt 41 passes through the center of the shaft 28 and through a drilled out opening 42 in the hub of the gear 31. This bolt 41, therefore, secures the gear 31 in the hub of the gear 22 and also secures the disk 39 and the radial bearing 24 in place. It will be seen also that the drilled hole 42 is tapped as shown in the drawings for the purpose of inserting a puller, which puller may be screwed into the tapped hole and against the center of the pinion 22 for removing the gear 31 from the hub of said pinion. By further reference to the gears 20 and 22, it will be seen that when the pinion or gear 22 is reversed, the thrust on the shaft 28 is also reversed, and for the purpose of taking this reverse end thrust, a thrust bearing 43 is provided, having one of its disks 44 directly against a shoulder on the gear 22 and its other disk 45 resting against the outer ring of the annular bearing 23, which latter bearing, and consequently the bearing 43, is held in place in the sleeve 25 by means of a ring 46, secured by the bolts 26.

It will be seen that the bearings 17, 24, 36, 37 and 38 are all mounted directly in integral parts of the cover or support 12, and the bearings 23 and 43 are mounted directly in a sleeve 25, which is in turn mounted directly in a machined part of said cover or support 12. Thus all of the bearings are mounted in the support 12 without any threaded parts between them and the support, so that accuracy in placing the bearings in the support is absolutely assured. Also it will be seen that the radial bearings are mounted directly upon the parts which rotate in them. The thrust bearings 36 and 37 are mounted directly upon the differential housing 18 and the thrust bearings 38 and 43 are mounted in direct contact with shoulders on an integral part of the shaft 28.

By reason of the construction hereinabove described, fewer parts are required and greater uniform accuracy is obtained by reason of the fact that there are fewer limits to be set in machining.

Having thus described my invention, what I claim and desire to secure by Letters Patent is:

1. In a motor vehicle driving gearing, the combination with the driving shaft and the driven shaft arranged at right angles thereto, of a pair of bevel gears connecting said shafts and having their teeth so formed as to cause end thrust of the driving shaft toward the driven shaft when the driving shaft is driving the driven shaft in one direction through said gears, and a thrust bearing for resisting said end thrust.

2. In a motor vehicle driving gearing, the combination with the driving shaft and the driven shaft arranged at right angles thereto, of a pair of bevel gears connecting said shafts and having their teeth so formed as to cause end thrust of the driving shaft toward the driven shaft when the former is driving the latter forwardly and in the opposite direction when driving rearwardly through said gears, and thrust bearings for resisting the end thrust in both directions.

3. The combination with driving and driven shafts arranged at right angles to each other in the same plane, of a pair of bevel gears on said shafts having their teeth so formed as to cause end thrust on the driving shaft toward the driven shaft and on the driven shaft away from the driving shaft, and thrust bearings for said shafts.

4. In a motor vehicle, the combination with the axle casing, the differential housing, and a driven bevel gear thereon, of a bevel pinion driving said gear and having a hollow hub portion, radial supporting bearings between said hub portion and said casing, and another gear having a hub pressed into the hub of said pinion.

5. In a motor vehicle, the combination with the axle casing, the differential housing, and a driven bevel gear thereon, of a bevel pinion driving said gear and having a hollow hub portion, radial supporting bearings between said hub portion and said casing, another gear having a hub pressed into the hub of said pinion, and a driving shaft having a bearing in said latter gear.

6. In a motor vehicle, the combination with the axle casing, the differential housing, and a driven bevel gear thereon, of a bevel pinion driving said gear, radial and thrust bearings for said pinion in said casing, and means passing through said pinion for securing one of the disks of said thrust bearing to said pinion.

7. In a motor vehicle, the combination with an axle casing having an opening therein, of a cover for said opening constituting a support, a differential housing in said casing carrying a bevel gear, a bevel pinion in mesh with said gear, and nonadjustable radial and thrust bearings for said housing and said pinion in integral parts of said support.

8. In a motor vehicle, the combination with the axle casing and the driving shaft and differential housing therein, of a bevel pinion and gear connecting said shaft and housing and having tangentially arranged teeth whereby the driving end thrust on the pinion is toward said housing, and a thrust bearing for said pinion in said casing mounted between said pinion and the differential housing.

9. In a motor vehicle, the combination with the axle casing and the driving shaft and differential housing therein, of a driven bevel gear on the differential housing, a driving bevel pinion on the driving shaft in mesh with said gear, said gear and pinion having tangentially arranged teeth and the pinion being of smaller diameter than the gear whereby the end thrust on the pinion when driving in one direction is toward the housing, bearings in the casing for the differential housing, and bearings in the casing for the driving shaft adapted to resist said end thrust toward the housing.

10. In a motor vehicle, the combination with the axle casing and the driving shaft and differential housing therein, of a driven bevel gear on the differential housing, a driving bevel pinion on the driving shaft in mesh with said gear, said gear and pinion having tangentially arranged teeth and the pinion being of smaller diameter than the gear whereby the end thrust on the pinion when driving in one direction is toward the housing, and when driving in the other direction is away from said housing, bearings in the casing for the differential housing, and bearings in the casing for the driving shaft adapted to resist end thrust on said shaft in both directions.

In testimony whereof I affix my signature in the presence of two witnesses.

ALLEN LOOMIS.

Witnesses:
 CLAIR S. COTE,
 LeRoi J. WILLIAMS.